US010289467B2

(12) United States Patent
Schumacher et al.

(10) Patent No.: US 10,289,467 B2
(45) Date of Patent: May 14, 2019

(54) ERROR COORDINATION MESSAGE FOR A BLADE DEVICE HAVING A LOGICAL PROCESSOR IN ANOTHER SYSTEM FIRMWARE DOMAIN

(71) Applicant: HEWLETT-PACKARD DEVELOPMENT COMPANY, L.P., Houston, TX (US)

(72) Inventors: Derek Schumacher, Auburn, CA (US); Sylvia K Myer, Fort Collins, CO (US); Russ W Herrell, Fort Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 326 days.

(21) Appl. No.: 14/780,976

(22) PCT Filed: Mar. 28, 2013

(86) PCT No.: PCT/US2013/034277
§ 371 (c)(1),
(2) Date: Sep. 28, 2015

(87) PCT Pub. No.: WO2014/158161
PCT Pub. Date: Oct. 2, 2014

(65) Prior Publication Data
US 2016/0188394 A1    Jun. 30, 2016

(51) Int. Cl.
*G06F 11/00*    (2006.01)
*G06F 11/07*    (2006.01)
(52) U.S. Cl.
CPC ........ *G06F 11/079* (2013.01); *G06F 11/0709* (2013.01); *G06F 11/0712* (2013.01);
(Continued)

(58) Field of Classification Search
CPC ...... G06F 13/385; G06F 9/5077; G06F 11/00; G06F 11/0724; G06F 11/0751; G06F 11/0766

See application file for complete search history.

(56) References Cited

U.S. PATENT DOCUMENTS

| 6,094,699 A | 7/2000 | Surugucchi |
| 6,199,107 B1 | 3/2001 | Dujari |

(Continued)

FOREIGN PATENT DOCUMENTS

| CN | 1655519 A | 8/2005 |
| CN | 101371224 | 2/2009 |

(Continued)

OTHER PUBLICATIONS

Brey et al., "BladeCenter chassis management," Nov. 2005, IBM J. Res. & Dev. vol. 49, No. 6, <http://citeseerx.ist.psu.edu/viewdoc/download?doi=10.1.1.87.8078&rep=rep1&type=pdf>.

(Continued)

*Primary Examiner* — Loan L. T. Truong
(74) *Attorney, Agent, or Firm* — Hewlett Packard Enterprise Patent Department

(57) ABSTRACT

Examples disclosed herein relate to an error coordination message for a blade device having a logical processor in another system firmware (SFW) domain. Examples include a partition of a blade system to run an operating system (OS) utilizing blade devices including respective logical processors operating in different SFW domains. Examples further include an error coordination message made available to one of the blade devices by another of the blade devices.

20 Claims, 4 Drawing Sheets

(52) U.S. Cl.
CPC ...... *G06F 11/0751* (2013.01); *G06F 11/0778* (2013.01); *G06F 11/0784* (2013.01)

(56) References Cited

U.S. PATENT DOCUMENTS

| | | | |
|---|---|---|---|
| 6,279,085 B1 | 8/2001 | Carpenter et al. | |
| 6,418,525 B1 | 7/2002 | Charney | |
| 6,453,344 B1 | 9/2002 | Ellsworth et al. | |
| 6,684,343 B1 | 1/2004 | Boucier et al. | |
| 6,988,169 B2 | 1/2006 | Burger et al. | |
| 7,064,376 B2 | 6/2006 | Shau | |
| 7,096,469 B1 | 8/2006 | Kubala et al. | |
| 7,200,800 B2* | 4/2007 | St. Clair | G06F 11/08 714/766 |
| 7,222,339 B2 | 5/2007 | Rothman et al. | |
| 7,353,375 B2 | 4/2008 | Cepulis | |
| 7,383,461 B2 | 6/2008 | Buckler et al. | |
| 7,441,066 B2* | 10/2008 | Bouchier | G06F 15/177 710/301 |
| 7,474,623 B2 | 1/2009 | Boyd et al. | |
| 7,480,747 B2 | 1/2009 | Bell et al. | |
| 7,603,516 B2 | 10/2009 | Allen | |
| 7,694,298 B2 | 4/2010 | Goud et al. | |
| 7,752,495 B2 | 7/2010 | Zorek, Sr. et al. | |
| 7,814,366 B2 | 10/2010 | Apparao et al. | |
| 7,921,179 B1 | 4/2011 | Zheng et al. | |
| 8,090,932 B1 | 1/2012 | Kwan | |
| 8,140,871 B2 | 3/2012 | Abdul et al. | |
| 8,151,147 B2 | 4/2012 | Rajkumari et al. | |
| 8,180,996 B2 | 5/2012 | Fullerton et al. | |
| 8,230,145 B2 | 7/2012 | Bresniker | |
| 8,347,070 B1 | 1/2013 | Bacha et al. | |
| 8,352,710 B2 | 1/2013 | Bell et al. | |
| 8,516,102 B2* | 8/2013 | Chen | G06F 15/161 709/220 |
| 8,527,806 B2* | 9/2013 | Endou | G06F 11/073 714/42 |
| 8,788,750 B2 | 7/2014 | Jacobson et al. | |
| 8,836,536 B2* | 9/2014 | Marwah | H04Q 9/00 340/870.01 |
| 9,697,008 B2* | 7/2017 | Schumacher | G06F 9/4403 |
| 9,747,116 B2* | 8/2017 | Schumacher | G06F 9/4406 |
| 9,781,015 B2* | 10/2017 | Schumacher | G06F 9/50 |
| 10,055,377 B2* | 8/2018 | Rupanagunta | G06F 13/4282 |
| 2001/0013089 A1 | 8/2001 | Weber | |
| 2002/0052914 A1 | 5/2002 | Zalewski et al. | |
| 2002/0087652 A1* | 7/2002 | Davis | G06F 9/5016 709/213 |
| 2002/0099886 A1 | 7/2002 | Emerson et al. | |
| 2002/0105966 A1* | 8/2002 | Patel | H04L 47/6225 370/463 |
| 2003/0061543 A1* | 3/2003 | Misaka | G06F 9/45537 714/38.13 |
| 2004/0024831 A1 | 2/2004 | Yang et al. | |
| 2004/0139368 A1 | 7/2004 | Austen et al. | |
| 2004/0186688 A1 | 9/2004 | Nejedlo | |
| 2004/0255286 A1 | 12/2004 | Rothman | |
| 2005/0015430 A1 | 1/2005 | Rothman et al. | |
| 2005/0021847 A1 | 1/2005 | Rothman et al. | |
| 2005/0026486 A1 | 2/2005 | Thomas | |
| 2005/0060531 A1 | 3/2005 | Davis et al. | |
| 2005/0144434 A1* | 6/2005 | Taylor | G06F 1/24 713/2 |
| 2005/0172164 A1 | 8/2005 | Fox et al. | |
| 2005/0257213 A1 | 11/2005 | Chu et al. | |
| 2006/0002427 A1* | 1/2006 | MacInnis | G06F 17/30905 370/477 |
| 2006/0004942 A1 | 1/2006 | Hetherington et al. | |
| 2006/0010352 A1 | 1/2006 | Mukherjee et al. | |
| 2006/0036889 A1 | 2/2006 | Arai | |
| 2006/0095595 A1* | 5/2006 | Dalton | G06F 1/3209 710/5 |
| 2006/0265567 A1 | 11/2006 | Ji | |
| 2007/0067318 A1 | 3/2007 | Wolafka et al. | |
| 2007/0067432 A1 | 3/2007 | Tarui et al. | |
| 2007/0067614 A1 | 3/2007 | Berry et al. | |
| 2007/0083723 A1* | 4/2007 | Dey | G06F 11/2033 711/163 |
| 2007/0150713 A1 | 6/2007 | Almeida et al. | |
| 2007/0174553 A1 | 7/2007 | Morrow et al. | |
| 2007/0174667 A1* | 7/2007 | Brey | G06F 11/1666 714/6.1 |
| 2007/0245423 A1 | 10/2007 | Herington | |
| 2008/0140930 A1* | 6/2008 | Hotchkiss | G06F 3/0605 711/114 |
| 2008/0183626 A1 | 7/2008 | Romero et al. | |
| 2008/0229049 A1 | 9/2008 | Nanda et al. | |
| 2008/0229146 A1 | 9/2008 | Susumu | |
| 2008/0281475 A1* | 11/2008 | Hirai | G05D 23/1931 700/300 |
| 2008/0282229 A1* | 11/2008 | Kim | G06F 9/454 717/124 |
| 2009/0006710 A1 | 1/2009 | Daniel | |
| 2009/0007120 A1 | 1/2009 | Fenger et al. | |
| 2009/0037657 A1 | 2/2009 | Bresniker | |
| 2009/0119748 A1 | 5/2009 | Yao | |
| 2009/0144579 A1* | 6/2009 | Swanson | G06F 11/0712 714/3 |
| 2009/0171511 A1 | 7/2009 | Tolentino | |
| 2009/0172228 A1 | 7/2009 | Zimmer | |
| 2009/0172232 A1* | 7/2009 | Zimmer | G06F 13/24 710/268 |
| 2009/0183016 A1 | 7/2009 | Chan | |
| 2009/0313390 A1 | 12/2009 | Ahuja | |
| 2010/0038963 A1* | 2/2010 | Shetty | G06F 11/3062 307/62 |
| 2010/0115077 A1* | 5/2010 | Tameshige | H04L 41/06 709/223 |
| 2010/0146592 A1* | 6/2010 | Gamare | G06F 11/2025 726/4 |
| 2010/0165874 A1* | 7/2010 | Brown | G06F 13/4022 370/254 |
| 2010/0186018 A1 | 7/2010 | Bell et al. | |
| 2011/0029652 A1 | 2/2011 | Chhuor et al. | |
| 2011/0093574 A1* | 4/2011 | Koehler | G06F 15/161 709/222 |
| 2011/0113115 A1* | 5/2011 | Chang | G06F 15/7803 709/213 |
| 2011/0138219 A1 | 6/2011 | Walton et al. | |
| 2011/0145411 A1 | 6/2011 | Ford et al. | |
| 2011/0145657 A1 | 6/2011 | Bishop et al. | |
| 2011/0154097 A1* | 6/2011 | Barlow | G06F 11/0727 714/3 |
| 2011/0161644 A1* | 6/2011 | Nojiri | G06F 9/5077 713/1 |
| 2012/0017077 A1* | 1/2012 | Darling | G06F 9/5077 713/100 |
| 2012/0047312 A1 | 2/2012 | Nathuji | |
| 2012/0102273 A1 | 4/2012 | Chang et al. | |
| 2012/0110154 A1 | 5/2012 | Adlung et al. | |
| 2012/0110588 A1* | 5/2012 | Bieswanger | G06F 8/65 718/104 |
| 2012/0210042 A1 | 8/2012 | Lim | |
| 2012/0278566 A1 | 11/2012 | Gilson | |
| 2012/0297381 A1* | 11/2012 | Ambat | G06F 9/45558 718/1 |
| 2013/0007310 A1 | 1/2013 | Inagaki | |
| 2013/0073811 A1 | 3/2013 | Beckmann et al. | |
| 2013/0275703 A1* | 10/2013 | Schenfeld | G06F 12/0292 711/165 |
| 2014/0258679 A1* | 9/2014 | McGee | G06F 13/4282 712/36 |
| 2014/0298079 A1* | 10/2014 | Dean | G06F 12/0246 714/4.5 |
| 2015/0006951 A1* | 1/2015 | Gurram | G06F 11/2028 714/4.12 |
| 2015/0052293 A1 | 2/2015 | Gaither et al. | |
| 2015/0095424 A1* | 4/2015 | Shimada | G06F 11/0709 709/204 |
| 2015/0189787 A1* | 7/2015 | Bailey | H05K 7/1489 361/679.48 |

(56) References Cited

U.S. PATENT DOCUMENTS

| | | | |
|---|---|---|---|
| 2016/0043912 A1* | 2/2016 | Schumacher | G06F 9/50 |
| | | | 714/49 |
| 2016/0055012 A1* | 2/2016 | Schumacher | G06F 9/4406 |
| | | | 713/100 |
| 2016/0292038 A1* | 10/2016 | Swanson | G06F 11/2023 |
| 2016/0299792 A1* | 10/2016 | Calhoun | G06F 9/5072 |
| 2016/0349812 A1* | 12/2016 | Goh | G06F 1/206 |
| 2017/0242820 A1* | 8/2017 | Rupanagunta | G06F 13/4282 |

FOREIGN PATENT DOCUMENTS

| | | |
|---|---|---|
| EP | 0636973 | 2/1995 |
| EP | 1636696 A2 | 3/2006 |
| EP | 2239662 A2 | 10/2010 |
| JP | 2007-172591 | 7/2007 |
| JP | 2007526527 | 9/2007 |
| JP | 2010-250817 | 11/2010 |
| TW | I231424 | 4/2005 |
| TW | 200608188 | 3/2006 |
| TW | 200723089 | 6/2007 |
| TW | 201025025 A | 7/2010 |
| WO | WO-2006004875 A1 | 1/2006 |
| WO | WO-2009154626 A1 | 12/2009 |
| WO | WO-2011071498 | 6/2011 |
| WO | WO-2013126056 | 8/2013 |

OTHER PUBLICATIONS

Cisco Unified Computing System: Architecture for Implementing the Next Phase in an Industry Transition; http://www.cisco.com/en/US/prod/collateral/ps10265/ps10281/solution_overview_c22-522771.pdf >; Nov. 2012.

Cisco; Achieve Automated, End-to-end Firmware Management with Cisco UCS Manager ; http://www.cisco.com/en/US/solutions/collateral/ns340/ns517/ns224/ins944/white_paper_c11-588010_ps10280_Products_White_Paper.html >; Nov. 28, 2012.

Deployment Guide: Deploying 8Gb/s Fibre Channel with HP Bladesystem and VMware VSphere; http://book5.org/d/deployment-guide-deploying-8gb-s-fibre-channel-with-hp-w738-pdf.pdf >; Jun. 2010.

Gostin, Gary et al., "The Architecture of the HP Superdome Shared-Memory Multiprocessor," ICS '05 proceedings of the 19th annual international conference on supercomputing, ACM, pp. 239-245, 2005. See chapters 4 and 5.

IBM; Expansion Blades ; http://www-03.ibm.com/systems/bladecenter/hardware/expansion/memory.html >; Nov. 28, 2012.

IBM; IBM BladeCenter HX5 ; http://www-03.ibm.com/systems/bladecenter/hardware/servers/hx5/features.html >; Nov. 28, 2012.

International Searching Authority, International Search Report & Written Opinion, issued in PCT/US2013/034202, dated Dec. 2, 2013, 10 pages.

International Searching Authority, International Search Report & Written Opinion, issued in PCT/US2013/034236, dated Dec. 24, 2013, 9 pages.

International Searching Authority, International Search Report & Written Opinion, issued in PCT/US2013/034277, dated Dec. 27, 2013, 9 pages.

SGI® Altix® UV Systems Linux® Configuration and Operations Guide; http://techpubs.sgi.com/library/manuals/5000/007-5629-003/pdf/007-5629-003.pdf >; Jun. 2010.

Sun Blade 6000 Modular Systems From Oracle®; http://www.oracle.com/us/products/servers-storage/servers/blade/sun-blade-6000-modular-systems-wp-102376.pdf >; Jun. 2010.

"Advanced Configuration and Power Interface—Wikipedia, the free encyclopedia",Aug. 2011 (Aug. 1, 2011), Retrieved from the Internet on Jan. 15, 2016, 9 pages.

"UEFI vol. 2: Platform Initialization Specification—Driver Executuion Environment Core Interface",, Oct. 27, 2011 (Oct. 27, 2011), 218 pages.

"UEFI vol. 4: Platform Initialization Specification—System Management Mode Core Interface",, Oct. 27, 2011 (Oct. 27, 2011), 292 pages.

Andrew S. Tanenbaum, "Introduction," Structured Computer Organization, Ch. 1 (excerpt), 1984, Prentice-Hall Inc., Second Edition, pp. 10-12.

Anonymous: "System Management Mode—Wikipedia, the free encyclopedia",, Aug. 8, 2011 (Aug. 8, 2011), XP055215778, 4 pages.

EPO, Communication pursuant to Article 94(3) EPC, dated Feb. 7, 2017, issued in EP App No. 12869523.6, 12 pages.

EPO, Extended Supplementary Search Report, dated Oct. 13, 2015, EP App No. 12869523.6, 12 pps.

European Patent Office, Extended European Search Report, dated Dec. 2, 2016, issued in EP application No. 13880256.6, 12 pages.

European Patent Office, Extended European Search Report, dated Oct. 20, 2016, issued in EP application No. 13880294.7, 11 pages.

Frey et al, "IBM Unified Resource Manager Introduction and Overview", Jan./Mar. 2012, IBM, pp. 1-10.

International Searching Authority, The International Search Report and the Written Opinion, dated Dec. 27, 2012, issued in International Patent App No. PCT/US2012/035761, 10 Pages.

ISA/KR, International Search Report, dated Feb. 28, 2013, PCT/US2012/026128 filed Feb. 22, 2012, 9 pages.

Lim et al, "Disaggregated Memory for Expansions and Sharing in Blade Servers", ISCA'09, Jun. 2009, ACM, pp. 1-12.

Loic Duflot, "Using CPU System Management Mode to Circumvent Operating System Security Functions", Cansecwest 2009, 15 pages.

Mayer at al, "Unified Resource Manager Virtualization Management", Jan./Mar. 2012, IBM, pp. 1-9.

USPTO, Final Office Action dated Jul. 11, 2016, in U.S. Appl. No. 14/387,598, filed Apr 30, 2012.

USPTO, Final Office Action dated Nov. 30, 2016, in U.S. Appl. No. 14/378,971, filed Feb. 22, 2012.

USPTO, Non-final Office Action dated Apr. 19, 2016, in U.S. Appl. No. 14/387,598, filed Apr 30, 2012.

USPTO, Non-Final Office Action dated Mar. 25, 2016, in U.S. Appl. No. 14/378,971, filed Feb. 22, 2012.

Office Action received for European Patent Application No. 13880256.6, dated Oct. 10, 2018, 12 pages.

International Preliminary Report on Patentability received for PCT Patent Application No. PCT/US2013/034236, dated Oct. 8, 2015, 6 pages.

International Preliminary Report on Patentability received for PCT Patent Application No. PCT/US2013/034202, dated Oct. 8, 2015, 7 pages.

International Preliminary Report on Patentability received for PCT Application No. PCT/US2013/034277, dated Oct. 8, 2015, 6 pages.

* cited by examiner

ERROR COORDINATION MESSAGE FOR A BLADE DEVICE HAVING A LOGICAL PROCESSOR IN ANOTHER SYSTEM FIRMWARE DOMAIN

BACKGROUND

A blade system may include a plurality of blade devices mounted in a blade enclosure. Each of the blade devices may be a blade server, for example. In some examples, a user may set up a partition of the blade system to include one, several, or all of the blade devices mounted in the blade enclosure. In such examples, the partition may run an operating system (OS) and run application(s) with the OS.

BRIEF DESCRIPTION OF THE DRAWINGS

The following detailed description references the drawings, wherein.

DETAILED DESCRIPTION

Figure 1:
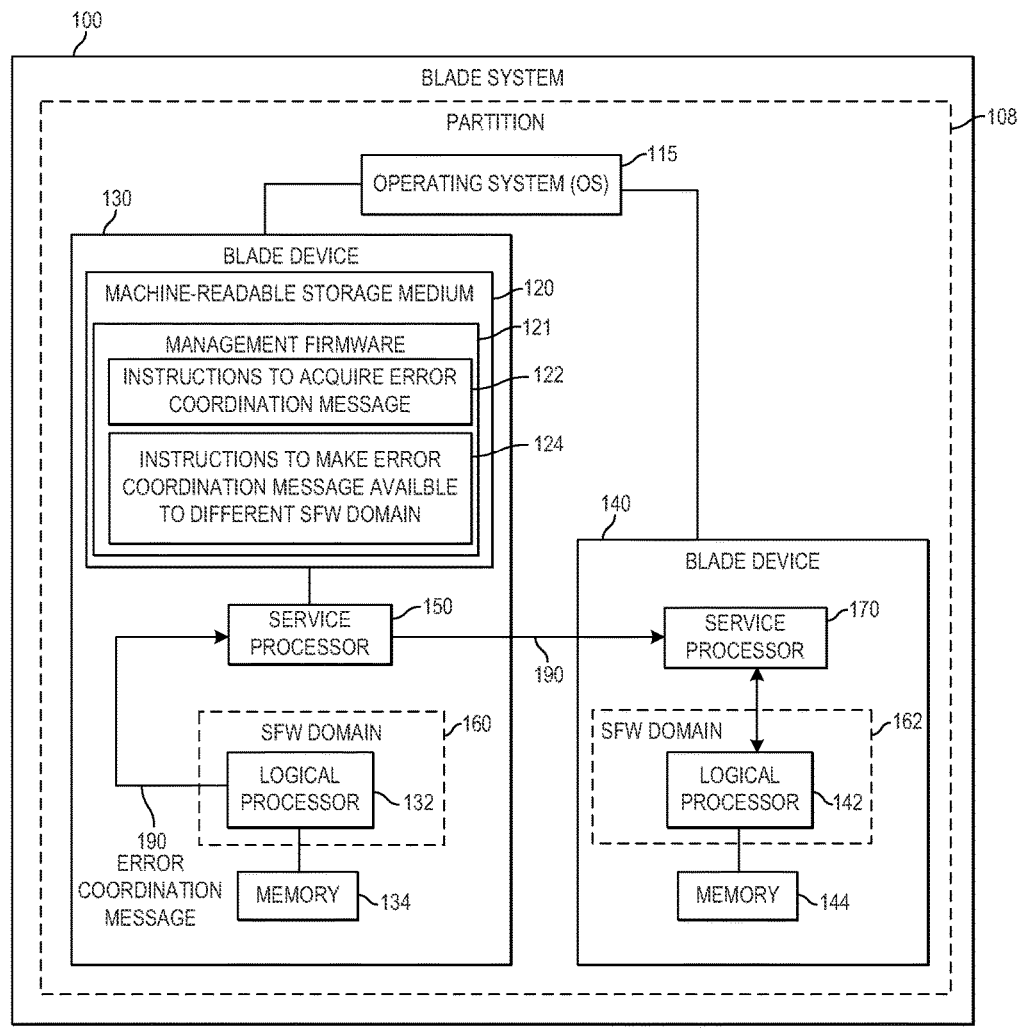
FIG. 1 is a block diagram of an example blade system to provide an error coordination message to another blade device having a logical processor in another system firmware (SFW) domain.

As noted above, a partition of a blade system may run an operating system (OS) and run application(s) with the OS. The partition that runs the OS may include multiple blade devices, each including logical processor(s) and memory. Each logical processor may be included on an integrated circuit (IC) (e.g., a chip). An IC including at least one central processing unit (CPU) may be referred to herein as a "CPU IC". In some examples, in addition to logical processor(s), a CPU IC may include at least one integrated memory controller to manage memory of the blade device. In such examples, a memory controller of a CPU IC may be able to manage a relatively limited amount of memory, which may limit the amount of memory available on a blade device, and thus in a partition.

More memory may be added to a partition by adding additional blade device(s) to the partition. However, license costs for some applications run by the OS may be calculated based on the number logical processors available for the application to utilize. As such, adding blade devices to a partition may substantially increase license costs for some applications due to the availability of the logical processors of the added blade devices.

As such, in some examples, a partition of a blade system may execute an OS with expansion and compute blade devices including first and second logical processors, respectively, wherein the first and second logical processors are to operate in different system firmware (SFW) domains. By placing the first and second logical processors in different SFW domains, and not identifying the first logical processor to the OS, such examples may enable the OS of the partition to utilize memory of the expansion blade device while the first logical processor is unavailable for use by the OS or application(s) run by the OS. As such, examples described herein may enable a partition to use memory of an expansion blade device for running an OS and application(s), without logical processor(s) of the expansion blade device increasing application license costs. However, because the first and second logical processors operate in different SFW domains, the logical processors may not be able to see errors and interrupts visible in the other's SFW domain.

To address these issues, examples described herein may provide management firmware (i.e., machine readable instructions) executable by a first service processor of a first blade device to acquire, from a logical processor of the first blade device, an error coordination message indicating detection of an error in the partition, and to make the error coordination message available to a logical processor of a second blade device via a second service processor of the second blade device, where the logical processors of the first and second blade devices are to operate in different SFW domains. In this manner, examples described herein may communicate information regarding errors between logical processors of different blade devices of a partition operating in different SFW domains to facilitate coordination of error response actions, such as the collection of error information.

Referring now to the drawings, FIG. 1 is a block diagram of an example blade system 100 to provide an error coordination message to another blade device having a logical processor in another SFW domain. In examples described herein, a blade system may be a computing system comprising a blade enclosure and at least one blade device mounted in the blade enclosure. Blade system 100 may comprise blade devices 130 and 140 each mounted in a blade enclosure of blade system 100. Blade system 100 may run an OS 115 with resources of each of blade devices 130 and 140. For example, OS 115 may be run by a partition 108 of blade system 100 including at least blade devices 130 and 140. In some examples, blade system 100 and partition 108 may include additional resources, such as those illustrated in FIG. 2, for example. Features of blade system 100 may also be described below in relation to FIG. 2, which is another block diagram of the example blade system 100 of FIG. 1.

As used herein, a "blade device" may be a physical computing device that comprises memory and at least one logical processor, and that is mountable to a blade enclosure. In some examples, a blade device may be a modular computing device that is physically mountable to a blade enclosure for operation, that includes certain core computing resources (e.g., CPU IC(s) and memory), and that excludes certain peripheral computing resource(s) (e.g., a power supply, cooling fan(s), external networking ports, and the like, or a combination thereof). As used herein, a "blade enclosure" may be a chassis to receive a plurality of blade devices and provide at least one peripheral resource for the received blade devices. For example, a blade enclosure may include fan(s) to cool mounted blade devices, at least one power supply to provide power to mounted blade devices, external network ports for mounted blade devices, and the like, or a combination thereof.

Blade device 130 may include a service processor 150 and a machine-readable storage medium 120 encoded with management firmware 121 including instructions 122 and 124. In some examples, management firmware 121 may include additional instructions. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), read-only memory (ROM), volatile memory, non-volatile memory, flash memory, a storage drive (e.g., a hard drive), a solid state drive, any type of storage disc (e.g., a Compact Disc Read Only Memory (CD-ROM), any other type of compact disc, a DVD, etc.), and the like, or a combination thereof. Further, any machine-readable storage medium described herein may be non-transitory. Any "memory" described herein may be at least a portion of at least one machine-readable storage medium.

Instructions of management firmware 121 are executable by service processor 150 to perform the functionalities described below in relation to instructions of management firmware 121. Service processor 150 may fetch, decode, and execute instructions stored on storage medium 120 to perform the functionalities described below. In examples described herein, a service processor may be at least one of a CPU, a semiconductor-based microprocessor, other electronic circuitry suitable for the retrieval and execution instructions stored on a machine-readable storage medium, or a combination thereof. Storage medium 120 may be a ROM storing management firmware 121. In some examples, management firmware 121 may be an instance of central electronic complex (CEC) firmware to be run by service processor 150 of blade device 130. In such examples, management firmware 121 may be referred to herein as a management firmware instance for blade device 130.

In some examples, each blade device of partition 108 may include at least one service processor to execute a respective management firmware instance (e.g., a respective instance of CEC firmware). In such examples, each blade device may store its management firmware instance (i.e., machine-readable instructions). For example, blade device 140 may include a service processor 170 in communication with service processor 150, and memory to store instructions of another management firmware instance (e.g., CEC firmware instance) executable by service processor 170 to perform functionalities described below in relation to service processor 170.

Additionally, blade device 130 may include a logical processor 132 and memory 134 associated with logical processor 132, and blade device 140 may include a logical processor 142 and memory 144 associated with logical processor 142. As used herein, a "logical processor" may be a CPU IC, a CPU of a CPU IC (e.g., one of a plurality of cores on a multi-core CPU IC), or a thread on a CPU (or core) of a CPU IC. In some examples, blade devices 130 and 140 may include additional resources, such as those illustrated in FIG. 2, for example. In some examples, blade device 130 may include a plurality of logical processors, some or all of which having associated memory. Also, in some examples, blade device 140 may include a plurality of logical processors, some or all of which having associated memory.

As used herein, memory "associated with" a logical processor (or "associated" memory of a logical processor) is memory managed by a memory controller integrated on the CPU IC including or constituting the logical processor. For example, a blade device including memory associated with a logical processor may comprise at least one memory module and a CPU IC including at least one logical processor (e.g., CPU or core) and at least one integrated memory controller to manage the memory module(s). In some examples, a blade device may include a plurality of CPU ICs, each including at least one integrated memory controller to manage memory module(s) of the blade device. As used herein, a memory module may be, for example, a dual in-line memory module (DIMM), a single in-line memory module (SIMM), or any other type of memory module including a plurality of memory devices.

Additionally, blade device 130 may include another machine-readable storage medium encoded with a first SFW instance including instructions executable by logical processor 132, and blade device 140 may include a machine-readable storage medium encoded with a second SFW instance including instructions executable by logical processor 142. As used herein, a "system firmware instance" (or "SFW instance") may be a set of machine executable instructions to boot and manage resources of a blade device. For example, after a reset, a logical processor of a blade device may begin to execute instructions of a SFW instance to initialize the logical processor for operation, and to initialize other resource(s) of the blade device, such as the memory associated with the logical processor. In some examples, this initialization of the logical processor and the associated memory may include a power-on self-test (POST) implemented by the SFW instance.

Instructions of a SFW instance, when executed by a logical processor, may also configure the logical processor to operate in a SFW domain associated with the SFW instance. As used herein, a "system firmware domain" (or "SFW domain") associated with a SFW instance may be an environment in which a logical processor booted by the SFW instance may operate when executing instructions of the SFW instance after booting. In some examples, a SFW domain may include a plurality of SFW resources, including, for example, SFW data structure(s) and SFW code (i.e., machine executable instructions). As used herein, a logical processor operating as part of a SFW domain may be a logical processor having access to the SFW resources of the SFW domain. In some examples, the SFW resources (e.g., the SFW data structure(s) and SFW code) of the SFW domain may be stored in a system management memory region (e.g., SMRAM) for the SFW domain. In such examples, a logical processor operating as part of a SFW domain may be a logical processor having access to the SFW resources stored in the system management memory region for the SFW domain.

A logical processor operating as part of a SFW domain may not have access to the SFW resources in the system management memory region at all times. Rather, the logical processor may have access at certain times (e.g., while booting), in certain mode(s) (e.g., a system management mode (SMM)), etc. In examples described herein, a logical processor having such limited access may still be considered to have access to the SFW resources in the system management memory region. In some examples, the system management memory region may be at least a portion of a machine-readable storage medium of at least one blade device mounted in a blade enclosure and including the logical processor having access to the region.

The SFW data structures may include, for example, advanced configuration and power interface (ACPI) table(s), system management BIOS (SMBIOS) table(s), memory data structures, interrupt vector(s), semaphores, and the like, or a combination thereof. The SFW data structure(s) may be generated and stored in the system management memory region by logical processor(s) executing instructions of the SFW instance. The SFW code may include executable instructions implementing interrupt service routines, such as system management interrupt (SMI) handler(s), or the like. The SFW code may also include executable instructions implementing error handler(s). The SFW code may be instructions of the SFW instance copied into the system management memory region.

In the example of FIG. 1, logical processors 132 and 142 may be configured to operate as part of different SFW domains by booting with different SFW instances. For example, logical processor 132 may be configured to operate as part of a first SFW domain 160 associated with the first SFW instance by booting logical processor 132 with instructions of the first SFW instance, and logical processor 142 may be configured to operate as part of a second SFW domain 162 associated with the second SFW instance by booting logical processor 142 with instructions of the second SFW instance. In examples described herein, logical processors configured to operate as part of different SFW domains may be logical processors that are configured to access different SFW resources in different system management memory regions (e.g., different SMRAM regions). In such examples, a logical processor configured to operate as part of one of the SFW domains may not have access to any SFW resources of another of the SFW domains.

For example, logical processor 132 configured to operate as part of SFW domain 160 may have access (e.g., in SMM) to first SFW resources for SFW domain 160 stored in a first system management memory region (e.g., SMRAM), and may not have access to second SFW resources for SFW domain 162 stored in a second system management memory region (e.g., SMRAM). In such examples, logical processor 142 configured to operate as part of SFW domain 162 may have access (e.g., in SMM) to the second SFW resources for SFW domain 162 stored in the second system management memory region, and may not have access to the first SFW resources for SFW domain 160 stored in the first system management memory region. For example, instructions of the first SFW instance may configure hardware address map(s) of logical processor 132 such that logical processor 132 is to access first SFW resources for SFW domain 160 stored in the first system management memory region (e.g., SMRAM), and instructions of the second SFW instance may configure hardware address map(s) of logical processor 142 such that logical processor 142 is to access second SFW resources for SFW domain 162 stored in a second system management memory region.

After a reset of at least a portion of blade system 100 (e.g., a reset of partition 108), logical processor 132 may execute instructions of the first SFW instance to configure logical processor 132 to operate as part of SFW domain 160, and logical processor 142 may execute instructions of the second SFW instance to configure logical processor 142 to operate as part of SFW domain 162. When executing instructions of the first SFW instance, logical processor 132 may also identify at least a portion of memory 134 associated with logical processor 132 that is available for use by OS 115. Also, when executing instructions of the second SFW instance, logical processor 142 may identify at least a portion of memory 144 associated with logical processor 142 that is available for use by OS 115.

In some examples, a monarch logical processor (e.g., a bootstrap logical processor) of partition 108 may be in charge of coordinating the booting of partition 108 to run OS 115. In such examples, the monarch logical processor (e.g., logical processor 132 or 142) may make available, for use by OS 115, the identified portions of memories 134 and 144. For example, the monarch logical processor may store a description of the identified memory in a region of memory of partition 108 that is accessible to OS 115. The description may be in any suitable format or data structure (e.g., table(s), etc.), such as at least one ACPI table.

In some examples, the monarch logical processor may also make available to OS 115 other resource(s) of blade device 130 or blade device 140, such as logical processor(s) of blade device 130 or 140, by identifying the resource(s) in the ACPI table(s). For example, OS 115 of partition 108 may utilize memory of compute and expansion blade devices of partition 108 and at least one logical processor of the compute blade device, while logical processor(s) of the expansion blade device are unavailable for use by OS 115. In this manner, the expansion blade device may add memory to the partition without its logical processor(s) adding to licensing costs. In such examples, the monarch logical processor may make the logical processor(s) of the compute blade device available to OS 115 (e.g., by identifying them in the ACPI table(s)) while not identifying the logical processor(s) of the expansion blade device to OS 115 (e.g., in the ACPI table(s)).

In some examples, either of blade devices 130 and 140 may be an expansion blade device, while the other is a compute blade device. In examples described herein, an expansion blade device may be a blade device designated to provide memory, but not logical processor(s), for use by an OS of a partition including the blade device. In examples described herein, a compute blade device may be a blade device designated to provide memory and logical processor(s) for use by an OS of a partition including the blade device. In some examples, each blade device of a partition may be designated as an expansion or compute blade device in partition information describing aspects of the configuration of the partition.

After resources of blade devices 130 and 140 (including at least the identified memory of blade devices 130 and 140) are made available to OS 115, OS 115 may execute on partition 108 utilizing the resources identified to OS 115 (e.g., in the ACPI table(s)). For example, if blade device 130 is designated as an expansion blade device and blade device 140 is designated as a compute blade device, OS 115 may execute and run application(s) utilizing the identified available memory of blade devices 130 and 140 and at least logical processor 142, while logical processor 132 is unavailable for use by OS 115 or any application(s) run by OS 115. In other examples, if blade devices 130 and 140 are designated as compute and expansion blade devices, respectively, OS 115 may execute and run application(s) utilizing the identified available memory of blade devices 130 and 140 and at least logical processor 132, while logical processor 142 is unavailable for use by OS 115 or any application(s) run by OS 115.

After OS 115 begins running as described above, logical processor 132 may detect an error in partition 108. For example, logical processor 132 may detect an error at blade device 130 of partition 108 in any suitable manner. For example, logical processor 132 may detect an error while interacting with other resources of partition 108 (e.g., memory 134 or 144), by detecting an indication of an error on blade device 130, in response to receiving an interrupt, or the like. In response to detecting the error, logical processor 132 may generate an error coordination message 190. In some examples, error coordination message 190 may identify the type of error detected by logical processor 132 in partition 108, and at least one error response action.

Example error types that may be identified in error coordination message 190 may include, for example, a correctable error, an uncorrectable error, a fatal error, or any other suitable type of error. Example error response action(s)

that may be identified in error coordination message 190 may include at least one of error information collection and a reset. For example, the error response action(s) identified in error coordination message 190 may include error information collection, error information collection followed by a reset, or a reset followed by error information collection.

Figure 2:
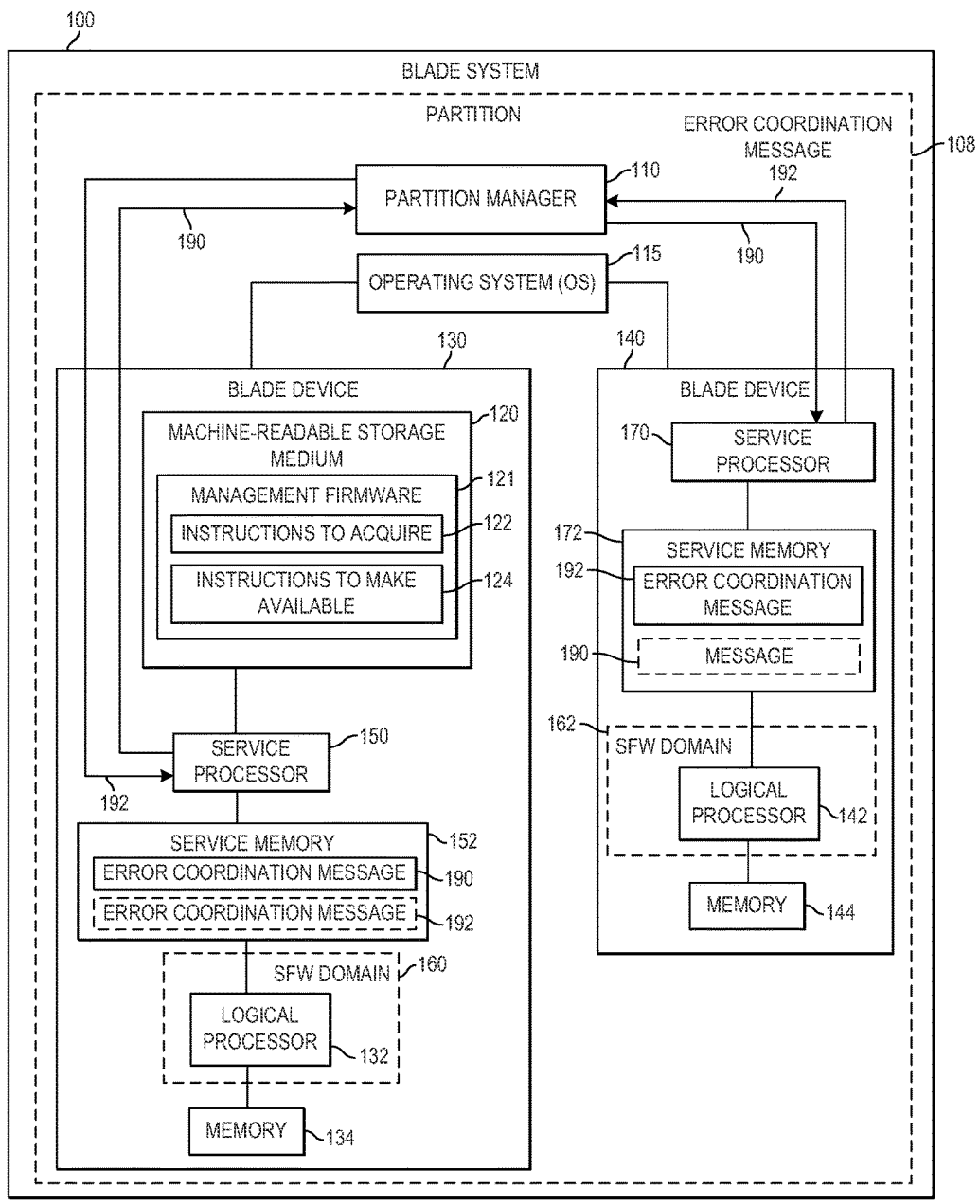
FIG. 2 is another block diagram of the example blade system of FIG. 1.

When executing instructions 122 of management firmware 121, service processor 150 may passively or actively acquire (i.e., receive, retrieve, etc.) message 190 from logical processor 132. Further, message 190 may be acquired directly or indirectly. For example, as illustrated in FIG. 2, instructions 122 may acquire message 190 indirectly via a service memory 152 of blade device 130, to which logical processor 132 and service processor 150 both have access. In such examples, instructions 122 may acquire error coordination message 190 from logical processor 132 via a buffer in service memory 152 utilized for passing messages between logical processor 132 and service processor 150.

Instructions 124, when executed by service processor 150, may make error coordination message 190 available to logical processor 142 of blade device 140 via service processor 170 of blade device 140. For example, as illustrated in FIG. 2, instructions 124 may provide message 190 to service processor 170 via a partition manager 110 for partition 108. In such examples, instructions 124, when executed by service processor 150, may provide message 190 to partition manager 110, which may provide message 190 to service processor 170.

In examples described herein, a partition manager for a partition may be an entity in charge of coordinating management of the partition in cooperation with management firmware instances of respective blade devices of the partition. The functionalities of the partition manager may be implemented in the form of electronic circuitry, in the form of executable instructions encoded on a machine-readable storage medium, or a combination thereof. For example, a partition manager may be implemented by a monarch CEC firmware instance for the partition executable by at least one service processor of the partition. Service processor(s) to execute the monarch CEC firmware instance may be service processor(s) of blade device(s) of the partition, service processor(s) separate from the blade device(s), or a combination thereof.

Referring again to FIG. 1, in other examples, service processor 150 executing instructions 124 may provide error coordination message 190 to service processor 170 directly (i.e., without passing message 190 to service processor 170 through partition manager 110). In such examples, instructions 124, when executed by service processor 150, may determine a plurality of SFW domains of partition 108. For example, instructions 124 may determine the plurality of SFW domains based on partition information provided to service processor 150 by a partition manager for partition 108 (e.g., partition manager 110 of FIG. 2). In some examples, the partition information may identify the SFW domains active in partition 108 after booting, for example. For example, instructions may determine that SFW domains 160 and 162 of logical processors 132 and 142, respectively, are active in partition 108.

In such examples, in response to the acquisition of error coordination message 190, instructions 124 may identify at least one of the determined SFW domains other than SFW domain 160 of logical processor 132, from which message 190 was received. For example, instructions 124 may identify SFW domain 162, which is different than the SFW domain 160 of logical processor 132.

In such examples, instructions 124 may provide error coordination message 190 to a respective service processor of each blade device of partition 108 including a logical processor operating in any of the identified SFW domain(s). For example, instructions 124 may provide message 190 to service processor 170 of blade device 140, which includes logical processor 142 configured to operate in identified SFW domain 162. In this manner, instructions 124 may provide the message 190 to blade device(s) having logical processors that operate in different SFW domain(s) than the SFW domain in which the error was detected.

Service processor 170 may make the received error coordination message 190 available to logical processor 142 so that it may take appropriate action in response to message 190. For example, when executing instructions of the second SFW instance associated with SFW domain 162, logical processor 142 may perform the error response action(s) identified in message 190. In examples in which the error response action(s) identified in message 190 include collection of error information, logical processor 142 may execute instructions of the second SFW instance to collect error information from registers associated with logical processor 142.

For example, logical processor 142 may collect error information (e.g., error log(s), etc.) from machine status registers (MSRs) of a CPU IC comprising (or constituting) logical processor 142. In such examples, logical processor 142 may further provide the collected error information to a fault management infrastructure (FMI) of blade system 100. In some examples, the error response action(s) identified in message 190 may also indicate that a reset is to be performed before or after the collection of the error information. In such examples, logical processor 142 executing instructions of the second SFW instance may cause at least logical processor 142 to reset. In some examples, the reset may be performed in response to a subsequent reset synchronization communication, to coordinate resets across partition 108.

As noted above, service processor 170 may make the received error coordination message 190 available to logical processor 142. For example, as illustrated in FIG. 2, after receiving error coordination message 190, service processor 170 may store message 190 in a service memory 172 of blade device 140 accessible to service processor 170 and logical processor 142. In such examples, service memory 172 may be utilized for passing messages between service processor 170 and logical processor 142. In examples in which blade device 140 is a compute blade device, logical processor 142 may be executing OS 115. In such examples, after storing message 190 in service memory 172, service processor 170 may provide a system management interrupt (SMI) to logical processor 142 to cause logical processor to enter system management mode (SMM) and access message 190 in service memory 172.

In other examples, blade device 140 may be an expansion blade device. In some examples, in addition to being unavailable for use by OS 115, each logical processor of an expansion blade device may be placed in a SFW execution mode in which the logical processor is to execute instructions of a SFW instance while OS 115 is executed by at least one logical processor of a compute blade device. In the SFW execution mode, the logical processor may remain available to execute other SFW code of the SFW instance, such as SMI handler(s), error handler(s), and the like. In examples in which blade device 140 is as expansion blade device, logical processor 142 may be in the SFW execution mode during execution of the OS by partition 108. In such examples, logical processor 142 may poll service memory 172 for error coordination messages when executing instructions of a SFW instance in the SFW execution mode. In such examples, logical processor 142 may access message 190 in service memory 172 after message 190 has been stored there by service processor 170.

In some examples, the SFW execution mode may be a system management mode (SMM). In examples described herein, SMM may be a mode in which a logical processor executes SFW code of a SFW domain in which the logical processor is configured to operate. In SMM, the logical processor may have access to the system management memory region (e.g., SMRAM) of its SFW domain and may execute SFW code stored in the system management memory region. Also, in SMM, the logical processor remains available to execute instructions of the SFW instance of its SFW domain, such as instructions of SMI handler(s), error handler(s), and the like. In other examples, the SFW execution mode may be any suitable state in which a logical processor of a partition is to execute code of a SFW instance (e.g., code implementing a loop) such that it remains available to execute other SFW code while other logical processor(s) of the partition are executing an OS.

In some examples, when executing instructions of the second SFW instance, logical processor 142 may generate an error coordination message 192 in response to detecting an error, as described above in relation to logical processor 132. For example, as illustrated in FIG. 2, logical processor 142 may detect an error at blade device 140 of partition 108 and provide message 192 to service processor 170. In some examples, logical processor 142 may provide message 192 to service processor 170 by storing error coordination message 192 in service memory 172.

Error coordination message 192 may identify at least one of a type of the detected error and error response action(s). Service processor 170 may acquire message 192 (e.g., access message 192 in service memory 172) and provide it to service processor 150 of blade device 130. For example, service processor 170 may provide message 192 to service processor 150 via partition manager 110, as illustrated in FIG. 2, or directly (e.g., not through partition manager 110) as described above in relation to message 190.

In such examples, when executing instructions 122, service processor 150 may actively or passively acquire error coordination message 192 indicating the detection of an error in partition 108 from service processor 170. Service processor 150 executing instructions 122 may then store error coordination message 192 in service memory 152 accessible to logical processor 132. In examples in which blade device 130 is a compute blade device, instructions 122 may further provide an SMI to logical processor 132 (in use by OS 115) to cause logical processor 132 to access message 192 and perform the identified error response action(s) with logical processor 132 (e.g., by executing instructions of the first SFW instance), as described above. In examples in which blade device 130 is an expansion blade device and logical processor 132 is in a SFW execution mode, logical processor 132 may detect message 192 in service memory 152 by polling service memory 152 for error coordination messages as part of the SFW execution mode, as described above.

In examples described above, blade devices may exchange error coordination messages to coordinate error handling across different SFW domains. For example, in examples in which blade device 130 is a compute blade device and blade device 140 is an expansion blade device, logical processor 132 available for use by OS 115 may detect a memory error when utilizing memory 144 of blade device 140. The MSRs of the CPU IC including (or constituting) logical processor 142 may include information useful for management of the error. However, these MSRs may be accessible exclusively by a logical processor (e.g., CPU or core) on the CPU IC, and not to logical processor 132, for example. In examples described herein, blade device 130 may provide an error coordination message 190 to blade device 140, and in response logical processor 142 of SFW domain 162 may collect the error information from the MSRs and provide it to a EMI for use in managing the error detected by logical processor 132. In other examples, an error coordination message may be used to cause a logical processor of a compute blade device configured to operate in first SFW domain to collect error information in response to detection of an error by a logical processor of an expansion blade device and configured to operate in a second SFW domain. In some examples, functionalities described herein in relation to FIGS. 1-2 may be provided in combination with functionalities described herein in relation to any of FIGS. 3-5.

Figure 3:
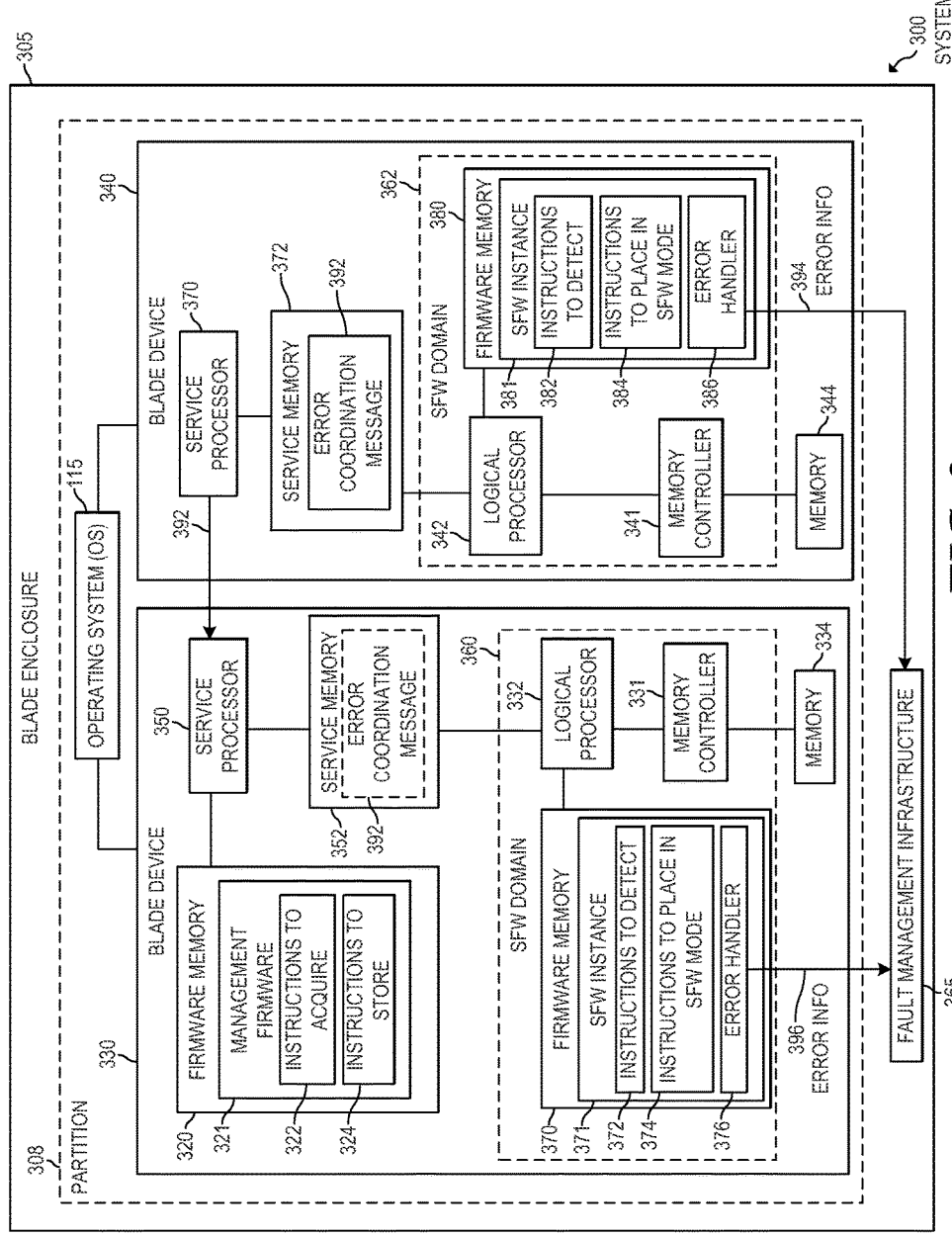
FIG. 3 is a block diagram of an example system to collect error information with a logical processor in response to receipt of an error coordination message.

FIG. 3 is a block diagram of an example system 300 to collect error information with a logical processor in response to receipt of an error coordination message. In the example of FIG. 3, system 300 (e.g., blade system 300) comprises a blade enclosure 305, and blade devices 330 and 340 mounted in blade enclosure 305. In other examples, system 300 may include more or fewer blade devices mounted in blade enclosure 305.

Blade device 330 comprises a logical processor 332, memory 334 associated with logical processor 332, and a memory controller 331 to manage memory 334. Memory controller 331 and logical processor 332 may be integrated into a single CPU IC. For example, memory controller 331 may be integrated in a CPU IC comprising or constituting logical processor 332. In some examples, the CPU IC including logical processor 332 and memory controller 331 may also include additional memory controller(s) to manage other memory of blade device 330. In some examples, blade device 330 may include a plurality of logical processors, some or all of which having associated memory. Blade device 330 may further comprise a firmware memory 370 storing (or otherwise encoded with) a SFW instance 371 including instructions 372 and 374, and an error hander 376 implemented by instructions of SFW instance 371. After a reset, instructions of SFW instance 371 may configure logical processor 332 to operate as part of a SFW domain 360, as described above. Instructions of SFW instance 371 are also executable by logical processor 332 to perform the functionalities described below.

Blade device 340 comprises a logical processor 342, memory 344 associated with logical processor 342, and a memory controller 341 to manage memory 344. Memory controller 341 and logical processor 342 may be integrated into a single CPU IC. For example, memory controller 341 may be integrated in a CPU IC comprising or constituting logical processor 342. In some examples, the CPU IC including logical processor 342 and memory controller 341 may also include additional memory controller(s) to manage other memory of blade device 340. In some examples, blade device 340 may include a plurality of logical processors, some or all of which having associated memory. The functionalities of each of memory controllers 331 and 341 may be implemented in the form of electronic circuitry, in the form of executable instructions encoded on a machine-readable storage medium, or a combination thereof.

Blade device 340 may further comprise a firmware memory 380 storing (or otherwise encoded with) a SFW instance 381 including instructions 382 and 384, and an error hander 386 implemented by instructions of SFW instance 381. After a reset, instructions of SFW instance 381 may configure logical processor 342 to operate as part of a SFW domain 362, different than SFW domain 360, as described above. Instructions of SFW instance 381 are also executable by logical processor 342 to perform the functionalities described below.

Blade device 330 may further include a service processor 350 and firmware memory 320 storing (or otherwise encoded with) management firmware 321 including instructions 322 and 324. Management firmware 321 may be an instance of CEC firmware for blade device 330. Instructions of management firmware 321 are executable by service processor 350 to perform the functionalities described below in relation to instructions of management firmware 321. Blade device 330 may further include service memory 352 accessible to service processor 350 and logical processor 332.

Additionally, blade device 340 may further include a service processor 370 and service memory 372 accessible to service processor 370 and logical processor 342. In some examples, blade device 340 may also include a firmware memory storing management firmware (e.g., an instance of CEC firmware for blade device 340). In such examples, service processor 370 may execute the instructions of the management firmware (i.e., the instance on blade device 340) to perform the functionalities described below in relation to service processor 370.

Blade system 300 may run an OS 115, as described above in relation to FIG. 1, with resources of each of blade devices 330 and 340. For example, OS 115 may be run by a partition 308 of blade system 300 including at least blade devices 330 and 340. In other examples, partition 308 may include additional blade devices mounted in blade enclosure 305. Partition 308 may include fewer than all of the blade devices mounted in blade enclosure 305. In the example of FIG. 3, OS 115 may utilize memory of each of blade devices 330 and 340, as described above in relation to FIGS. 1-2. For example, OS 115 may utilize at least a portion of memory 334 and at least a portion of memory 344.

In such examples, a monarch processor of partition 308 may make the respective portions of memory 334 and memory 344 available for use by OS 115, as described above. In some examples, one of blade devices 330 and 340 may be a compute logical processor while the other is an expansion logical processor. In such examples, the monarch logical processor may also make available, for use by OS 115, the logical processor(s) of the compute device and not the logical processor(s) of the expansion blade device.

OS 115 may execute on partition 308 utilizing the resources identified to OS 115 (e.g., in ACPI table(s)), as described above. For example, if blade device 330 is designated as an expansion blade device and blade device 340 is designated as a compute blade device, OS 115 may execute and run application(s) utilizing the identified available memory of blade devices 330 and 340 and at least logical processor 342, while logical processor 332 is unavailable for use by OS 115 or any application(s) run by OS 115. In other examples, if blade devices 330 and 340 are designated as compute and expansion blade devices, respectively, OS 115 may execute and run application(s) utilizing the identified available memory of blade devices 330 and 340 and at least logical processor 332, while logical processor 342 is unavailable for use by OS 115 or any application(s) run by OS 115.

After OS 115 begins running as described above, instructions 382 executed by logical processor 342 may detect an error in partition 308 in any suitable manner. For example, if blade device 340 is a compute blade device, logical processor 342 may detect the error in response to an SMI. In examples in which blade device 340 is an expansion blade device and blade device 330 is a compute blade device, logical processor 342 may execute instructions 384 of SFW instance 381 during a boot process to place logical processor 342 in a SFW execution mode. As described above, logical processor 342 may execute instructions of SFW instance 381 in the SFW execution mode while OS 115 is executed by at least logical processor 332. In the SFW execution mode, logical processor 342 may execute instructions 382 to poll for error indication(s), interrupt indication(s) or both. In such examples, instructions 382 may detect the occurrence of an error in response to detecting an error indication or interrupt indication while polling. In some examples, logical processors may poll error sources (e.g., registers, etc.) for error indications, and may poll interrupt sources (e.g., interrupt pending registers, etc.) for interrupt indications.

In response to the detection of the occurrence of the error, instructions 382 may provide an error coordination message 392 to service processor 350 of blade device 330 via service processor 370 of blade device 340. For example, instructions 382 may store error coordination message 392 in service memory 372, from which service processor 370 may acquire message 392. In such examples, service processor 370 may provide error coordination message 392 to service processor 350 either directly or indirectly (e.g., via a partition manager for partition 308), as described above.

Also in response to the detection of the occurrence of the error, logical processor 342 may execute instructions of error handler 386 of SFW instance 381 to collect error information stored on blade device 340 and provide the collected error information 394 to a fault management infrastructure (FMI) 365 of blade system 300. In some examples, logical processor 342 may collect error information (e.g., error log(s), etc.) from MSRs of a CPU IC comprising (or constituting) logical processor 342. The functionalities of EMI 365 may be implemented in the form of electronic circuitry, in the form of executable instructions encoded on a machine-readable storage medium, or a combination thereof.

In the example of FIG. 3, service processor 350 of blade device 330, when executing instructions 322 of management firmware 321, may actively or passively acquire (i.e., receive, retrieve, etc.) error coordination message 392 provided by blade device 340 (i.e., service processor 370). Message 392 may describe the error detected by logical processor 342. In such examples, when executing instructions 324, service processor 350 may store error coordination message 392 in service memory 352 accessible to logical processor 332.

When executing instructions 372 of SFW instance 371, logical processor 332 may detect error coordination message 392 in service memory 352. In examples in which blade device 330 is a compute blade device, service processor 350 may provide an SMI to logical processor 332 after storing message 392 in service memory 352, and logical processor 332 may detect message 392 in service memory 352 in response to the SMI.

In examples in which blade device 330 is an expansion blade device, logical processor 332 executing instructions 372 may detect error coordination message 392 while polling service memory 352. For example, if blade device 330 is an expansion blade device and blade device 340 is a compute blade device, logical processor 332 may execute instructions 374 of SFW instance 371 during a boot process to place logical processor 332 in a SFW execution mode. As described above, logical processor 332 may execute instructions of SFW instance 371 in the SFW execution mode while OS 115 is executed by at least logical processor 342. In the SFW execution mode, logical processor 332 may execute instructions 372 to poll service memory 352 for error coordination messages and thereby detect error coordination message 392 in service memory 352.

In some examples, in response to detection of message 392, logical processor 332 may execute instructions of error handler 376 to collect error information stored on blade device 330, based on the content of message 392, and provide the collected error information 396 to EMI 365 of blade system 300. In some examples, logical processor 332 may collect the error information (e.g., error log(s), etc.) from MSRs of a CPU IC comprising (or constituting) logical processor 332.

In some examples, error coordination message 392 may include an identification of the type of the error detected by logical processor 342. In such examples, logical processor 332, executing instructions of error handler 376, may determine an error response action based on the identified type of the detected error. For example, blade device 330 may have access to a policy table indicating what action to take for each type of error. In such examples, logical processor 332 may determine the error response action to take based on the type of error identified in message 392. For example, logical processor 332 executing instructions of error handler 376 may determine that the appropriate response to the identified type of error is to collect error information stored on blade device 330. In response, logical processor 332 executing instructions of error handler 376 may collect the error information stored on blade device 330 as described above (e.g., from MSRs of a CPU IC comprising or constituting logical processor 332).

In other examples, in addition to the type of error detected, message 392 may identify error response action(s) to be performed, as described above. In such examples, logical processor 332 executing instructions of error handler 376 may perform the identified error response action(s), such as collecting error information stored on blade device 330, which may then be provided to FMI 365. In some examples, functionalities described herein in relation to FIG. 3 may be provided in combination with functionalities described herein in relation to any of FIGS. 1-2 and 4-5.

Figures 4, 5:
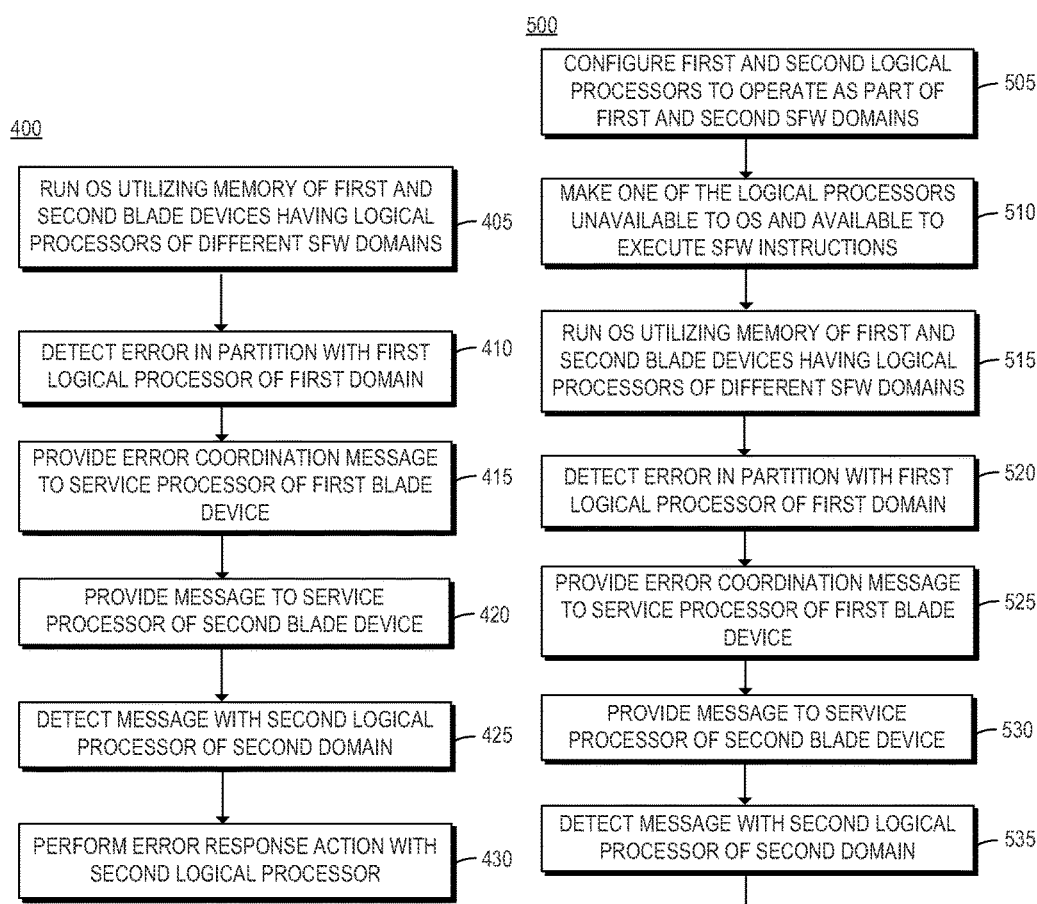
FIG. 4 is a flowchart of an example method for providing an error coordination message to another blade device having a logical processor in another system firmware (SFW) domain via service processors.
FIG. 5 is a flowchart of an example method for collecting error information with logical processors operating in different SFW domains using respective error handlers.

FIG. 4 is a flowchart of an example method 400 for providing an error coordination message to another blade device having a logical processor in another system firmware (SFW) domain via service processors. Although execution of method 400 is described below with reference to blade system 300 of FIG. 3, other suitable systems for execution of method 400 can be utilized (e.g., blade system 100 or 200). Additionally, implementation of method 400 is not limited to such examples.

At 405 of method 400, partition 308, including blade devices 330 and 340, may run OS 115 utilizing at least a portion of memory 334 of blade device 330 associated with logical processor 332 and at least a portion of memory 344 of blade device 340 associated with logical processor 342. In such examples, logical processor 332 may be configured to operate in a SFW domain 360 and logical processor 342 may be configured to operate in a different SFW domain 362.

At 410, logical processor 342 executing instructions 382 may detect an error in partition 308. At 415, logical processor 342 executing instructions 382 may provide, to service processor 370, an error coordination message 392 identifying a type of the detected error and at least one error response action. In some examples, logical processor 342 may provide message 392 to service processor 370 via a service memory 372 to which service processor 370 has access. In such examples, service processor 370 and logical processor 342 may utilize at least a portion of service memory 372 as a buffer for message passing.

At 420, service processor 370 of blade device 340 may provide error coordination message 392 to service processor 350 of blade device 330, either directly or indirectly, as described above. At 425, logical processor 332 executing instructions 372 of SFW instance 371 may detect error coordination message 392 provided to service processor 350. For example, after acquiring message 392, service processor 350 may store message 392 in service memory 352, where it may be detected by logical processor 332, as described above. At 430, logical processor 332 executing instructions of error handler 376 may perform the error response action(s) identified in error coordination message 392. For example, logical processor 332 may collect error information, as described above, if error information collection is one of the identified error response action(s).

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

FIG. 5 is a flowchart of an example method 500 for collecting error information with logical processors operating in different SFW domains using respective error handlers. Although execution of method 500 is described below with reference to blade system 300 of FIG. 3, other suitable systems for execution of method 500 can be utilized (e.g., blade system 100 or 200). Additionally, implementation of method 500 is not limited to such examples.

At 505 of method 500, after a reset of at least partition 308, instructions of SFW instance 371, when executed by logical processor 332, may configure logical processor 332 to operate as part of SFW domain 360 associated with SFW instance 371. Also at 505, after the reset, instructions of SFW instance 381, when executed by logical processor 342, may configure logical processor 342 to operate as part of a different SFW domain 362 associated with SFW instance 381. In such examples, logical processors 332 and 342 may be configured to operate in SFW domains 360 and 362, respectively, before OS 115 begins running on partition 308.

At 510, a given one of logical processors 332 and 334 may be placed in a SFW execution mode in which the given logical processor is to execute instructions of one of the SFW instances while OS 115 is executed by at least the other of the first and second logical processors. For example, when executed by logical processor 332, instructions 374 may determine that blade device 330 is an expansion blade device and, in response, may place logical processor 332 in SFW execution mode to execute instructions of SFW instance 371 while OS 115 is executed by at least logical processor 342. In other examples, when executed by logical processor 342, instructions 384 may determine that blade device 340 is an expansion blade device and, in response, may place logical processor 342 in SFW execution mode to execute instructions of SFW instance 381 while OS 115 is executed by at least logical processor 332, for example.

At 515, partition 308 may run OS 115 utilizing at least a portion of memory 334 of blade device 330 associated with logical processor 332 and at least a portion of memory 344 of blade device 340 associated with logical processor 342. In some examples, OS 115 may also utilize logical processor(s) of compute blade devices of partition 308.

At 520, logical processor 342 executing instructions 382 may detect an error in partition 308, as described above. At 525, logical processor 342 executing instructions 382 may provide, to service processor 370, an error coordination message 392 identifying a type of the detected error and at least one error response action. In some examples, logical processor 342 may provide message 392 to service processor 370 via a service memory 372 to which service processor 370 has access.

At 530, service processor 370 of blade device 340 may provide error coordination message 392 to service processor 350 of blade device 330, either directly or indirectly, as described above. At 535, logical processor 332 executing instructions 372 of SFW instance 371 may detect error coordination message 392 provided to service processor 350. For example, after acquiring message 392, service processor 350 may store message 392 in service memory 352, where it may be detected by logical processor 332, as described above.

At 540, logical processor 342 executing instructions of error handler 386 of SFW instance 381 may collect error information 394 stored on blade device 340. At 545, logical processor 332 executing instructions of error handler 376 of SFW instance 371 may collect error information 396 stored on blade device 330, as described above. In such examples, logical processor 332 may collect the error information based on the content of error coordination message 392 (e.g., the identified error type or identified error response action(s)).

At 550, logical processor 342 executing instructions of error handler 386 may cause a reset at blade device 340 in response to a reset synchronization communication from service processor 370. For example, logical processor 342 may reset itself in response to the reset synchronization communication. Also at 550, logical processor 332 executing instructions of error handler 376 may cause a reset at blade device 330 in response to a reset synchronization communication from service processor 350. For example, logical processor 332 may reset itself in response to the reset synchronization communication. Service processors 350 and 370 may provide the reset synchronization communications in response to receiving reset synchronization communication(s) from a partition manager for partition 308. In such examples, the error response action(s) identified in error coordination message 392 may include a reset action, and partition manager may provide reset synchronization communications to the blade devices of partition 308 to synchronize the resets of each blade device of partition 308.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

What is claimed is:

1. A system comprising:
   a partition running an operating system (OS) including a compute device, the OS to utilize first memory of the compute device and second memory of an expansion device including,
      first firmware memory storing a system firmware (SFW) instance;
      a first logical processor associated with the first memory, wherein the first logical processor is to operate in a first SFW domain;
      a service processor not operating in the first SFW domain; and
      second firmware memory including management firmware, wherein the management firmware comprises instructions executable by the service processor to:
         acquire an error coordination message, provided by the expansion device, describing an error detected by a second logical processor operating in a second SFW domain of the expansion device; and
         store the error coordination message in service memory of the compute device;
      wherein the SFW instance comprises instructions executable by the first logical processor to:
         detect the error coordination message in the service memory; and
         in response to the detection of the error coordination message, collect error information stored in the compute device.

2. The system of claim 1, wherein the error coordination message identifies a type of the error detected in the partition and at least one error response action.

3. The system of claim 2, wherein:
   the identified at least one error response action comprises error information collection and a blade device reset.

4. The system of claim 1, wherein the instructions to acquire the error coordination message further comprise instructions executable by the service processor to:
   acquire, from the second service processor of the expansion device, another error coordination message indicating detection of another error in the partition; and
   store the another error coordination message in a service memory of the first blade device accessible to the first logical processor.

5. The system of claim 1, wherein the error coordination message includes an identification of the type of the detected error, and the instructions to collect error information comprise instructions executable by the first logical processor to:
   determine an error response action based on the identified type of the detected error; and
   in response to a determination that the error response action includes collection of error information, collect first error information stored on the first blade device.

6. The system of claim 5, further comprising:
   third firmware memory storing another SFW instance;
   wherein the another SFW instance comprises instructions executable by the second logical processor to:
      detect the occurrence of the error; and
      in response to the detection of the occurrence of the error, provide the error coordination message to the service processor of the first blade device via a service processor of the second blade device.

7. The system of claim 6, wherein:
   the SFW instance further comprises a first error handler comprising the instructions to collect the first error information and instructions executable by the first logical processor to provide the first error information to a fault management infrastructure (FMI); and the another SFW instance further comprises a second error handler comprising instructions executable by the second logical processor to:
  in response to the detection of the occurrence of the error, collect second error information stored on the second blade device; and
  provide the second error information to the FMI.

8. The system of claim 7, wherein the another SFW instance further comprises instructions executable by the second logical processor to:
  place the second logical processor in a SFW execution mode in which the second logical processor is to execute instructions of the another SFW instance while the OS is executed by at least the first logical processor; and
  wherein the instructions to detect the occurrence of the error comprise instructions to poll for at least one of error and interrupt indications.

9. The system of claim 1, wherein the SFW instance further comprises instructions executable by the first logical processor to:
  place the first logical processor in a SFW execution mode in which the first logical processor is to execute instructions of the SFW instance while the OS is executed by at least the second logical processor; and
  poll the service memory for any error coordination message.

10. The system of claim 1, wherein the first logical processor executes the operating system and the second logical processor is unavailable to the operating system.

11. A system comprising:
  a partition running an OS including an expansion device, the OS to utilize, first memory of a compute device including a first logical processor operating in a first system firmware (SFW) domain, and second memory of the expansion device including,
    a second logical processor operating in a second SFW domain unavailable for use by the OS, and different from the first SFW domain, the second logical processor associated with the second memory;
    firmware memory including a SFW instance comprising instructions executable by the first logical processor to:
      detect an error;
      provide an error coordination message to a service processor of the compute device.

12. The system of claim 11, further comprising management firmware having instructions executable by the service processor to:
  determine a plurality of SFW domains of the partition, including the respective SFW domains of the first and second logical processors of the first and second blade devices; and
  in response to acquisition of the error coordination message, identify at least one of the SFW domains other than the SFW domain of the first logical processor;
  wherein the error coordination message is provided to a respective service processor of each blade device of the partition including a logical processor operating in any of the at least one identified SFW domain.

13. The system of claim 11, further comprising instructions of the SFW instance executable by the first logical processor to place the first logical processor in a SFW execution mode to poll for error indications or interrupt indications.

14. The system of claim 11, further comprising the expansion device having a service processor not operating in the second SFW domain, wherein the instructions of the SW instance provide the error coordination message to the service processor of the compute device by providing the error coordination message to the service processor of the expansion device.

15. The system of claim 14, further comprising the expansion device having a service memory outside the second SFW domain, wherein the instructions of the SW instance store the error coordination message in service memory of the compute device, from which the service processor of the expansion device acquires the error coordination message.

16. A method executable by a partition of a blade system comprising first and second blade devices including first and second logical processors, respectively, the method comprising:
  running an operating system (OS) utilizing memory of the first blade device associated with the first logical processor and memory of the second blade device associated with the second logical processor, wherein the first logical processor is to operate in a first system firmware (SFW) domain and is unavailable for use by the OS and the second logical processor is to operate in a second SFW domain different from the first SFW domain;
  detecting, with the first logical processor, an error in the partition;
  providing, to a first service processor of the first blade device outside the first SFW domain, an error coordination message identifying a type of the detected error and at least one error response action;
  providing the error coordination message from the first service processor to a second service processor of the second blade device;
  detecting, with the second logical processor, the error coordination message provided to the second service processor; and
  performing, with the second logical processor, the at least one error response action identified in the error coordination message.

17. The method of claim 16, further comprising:
  configuring the first logical processor to operate as part of the first SFW domain by executing instructions of a first SFW instance and before the running of the OS;
  configuring the second logical processor to operate as part of the second SFW domain by executing instructions of a second SFW instance and before the running of the OS, the second SFW instance to boot the partition to run the OS; and
  placing a given one of the first and second logical processors in a SFW execution mode in which the given logical processor is to execute instructions of one of the SFW instances while the OS is executed by at least the other of the first and second logical processors.

18. The method of claim 17, further comprising:
  collecting first error information stored on the first blade device with the first logical processor executing a first error handler of a first SFW instance; and
  causing a reset at the first blade device in response to a reset synchronization communication from the first service processor;
  wherein performing the indicated at least one error response action comprises:
    collecting second error information stored on the second blade device with the second logical processor executing a second error handler of a second SFW instance associated with the second SFW domain; and causing a reset at the second blade device in response to a reset synchronization communication from the second service processor.

19. The method of claim 16, wherein the first logical processor, while in the SFW execution mode, polls for error indications or interrupt indications.

20. The method of claim 16, wherein providing the error coordination message to the first service processor of the first blade device includes storing the error coordination message in service memory of the compute device, from which the service processor of the expansion device acquires the error coordination message.

\* \* \* \* \*